(12) United States Patent
Pan

(10) Patent No.: US 12,385,780 B2
(45) Date of Patent: Aug. 12, 2025

(54) METHOD OF ANALYZING A SPECTRAL PEAK

(71) Applicant: Thermo Fisher Scientific (Bremen) GmbH, Bremen (DE)

(72) Inventor: Ning Ning Pan, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 238 days.

(21) Appl. No.: 18/064,651

(22) Filed: Dec. 12, 2022

(65) Prior Publication Data

US 2023/0194344 A1 Jun. 22, 2023

(30) Foreign Application Priority Data

Dec. 17, 2021 (GB) ...................................... 2118410

(51) Int. Cl.
*G01J 3/28* (2006.01)
*G01J 3/18* (2006.01)

(52) U.S. Cl.
CPC ........... *G01J 3/2803* (2013.01); *G01J 3/1809* (2013.01); *G01J 2003/284* (2013.01); *G01J 2003/2859* (2013.01)

(58) Field of Classification Search
CPC .. G01J 3/2803; G01J 3/1809; G01J 2003/284; G01J 2003/2859;

(Continued)

(56) References Cited

U.S. PATENT DOCUMENTS 10,551,247 B1 2/2020 Van Benthem et al.
10,928,367 B2 2/2021 Kozawa (Continued)

FOREIGN PATENT DOCUMENTS

CN 109389065 A 2/2019
CN 111781240 A 10/2020

(Continued)

OTHER PUBLICATIONS

GB Search Report dated Mar. 10, 2022, mailed to GB Patent Application No. 2118410.6.

(Continued)

*Primary Examiner* — Hwa Andrew Lee

(57) ABSTRACT

Systems, devices, and methods of analyzing an interfered peak of a sample spectrum is disclosed. The sample spectrum may be generated using a detector of an optical spectrometer. The interfered peak may be produced by a plurality of spectral peaks of different wavelengths. The method may include generating interfered curve parameters representative of the peak shape of each spectral emission in the interfered peak based at least in part on a model of expected curve parameters for the optical spectrometer and a location of the interfered peak on the detector of the optical spectrometer; fitting a plurality of curves to the interfered peak, each curve corresponding to one of the plurality of spectral emissions of different wavelengths forming the interfered peak, wherein each curve is fitted using the interfered curve parameters provided by the model of expected peak parameters; and outputting the plurality of curves for further analysis.

20 Claims, 10 Drawing Sheets

(58) Field of Classification Search
CPC ....... G01J 2003/2863; G01J 2003/2866; G01J 2003/2883; G01J 2003/1208; G01J 2003/2843; G01J 3/28; G01J 3/2823; G01N 21/62; G06F 30/17
See application file for complete search history.

(56) References Cited

U.S. PATENT DOCUMENTS

| | | | |
|---|---|---|---|
| 11,085,882 B1* | 8/2021 | Bol'shakov | H01J 49/105 |
| 2003/0130823 A1 | 7/2003 | Potyrailo et al. | |
| 2015/0051843 A1* | 2/2015 | Wang | G01N 30/00 |
| | | | 702/23 |
| 2016/0054284 A1 | 2/2016 | Washburn | |
| 2017/0336260 A1 | 11/2017 | Fujihara et al. | |
| 2018/0259559 A1* | 9/2018 | Humphrey | G01R 23/16 |
| 2019/0391015 A1 | 12/2019 | Park et al. | |
| 2023/0003697 A1* | 1/2023 | Guetter | G06N 3/063 |

FOREIGN PATENT DOCUMENTS

| | | |
|---|---|---|
| GB | 2589884 A | 12/2019 |
| GB | 2586046 A | 2/2021 |
| JP | 2004138508 A | 5/2004 |
| JP | 2013108763 A | 6/2013 |
| WO | 2014200155 A1 | 12/2014 |

OTHER PUBLICATIONS

Yu et al., "Quantification and deconvolution of asymmetric LC-MS peaks using the bi-Guassian mixture model and statistical model selection" BMC Bioinformatics, 2010, 11:559, 10 pgs.

Di Masi et al. "Microfluidic setup for simultaneous separation and electrochemical determination of Hg2+ and Ag+ions in water" Electroanalysis, Oct. 29, 2020, pp. 781-788.

"ICP-OES Background and Interference Removal", Agilent article published on Aug. 21, 2020, 2 pgs.

Wall, Steve, "Stop Worrying About Interferences with These ICP-OES Solutions," Agilent Science & Technology Symposium, 2013, 32 pgs.

Gold H.S., et al., "Generalized Spectral Decomposition Method Applied to Infrared, Ultraviolet, and Atomic Emission Spectrometry," Analytical Chemistry, Sep. 1, 1976, vol. 48, No. 11, XP093046280, pp. 1540-1546.

* cited by examiner $$y = y_0 + He^{-0.5\left(\frac{x-x_c}{w_1}\right)^2} \qquad (x < x_c)$$

$$y = y_0 + He^{-0.5\left(\frac{x-x_c}{w_2}\right)^2} \qquad (x \geq x_c)$$

METHOD OF ANALYZING A SPECTRAL PEAK

CROSS-REFERENCE TO RELATED APPLICATIONS

This application claims the priority benefit under 35 U.S.C. § 119 to Great Britain Patent Application No. GB2118410.6, filed on Dec. 17, 2021, the disclosure of which is incorporated herein by reference in its entirety.

FIELD OF THE DISCLOSURE

The present disclosure relates to methods of analyzing spectral peaks. In particular, the present disclosure relates to methods of analyzing spectral peaks generated using an optical spectrometer.

BACKGROUND

Optical spectrometry, for example optical emission spectrometry is an analytical technique for analyzing a sample. In optical emission spectrometry, a sample may be excited, for example using a plasma source. The excited atoms of the sample emit light, wherein the wavelength of the light emitted is characteristic of the atoms present in the sample. As such, the light emitted by the sample comprises a plurality of spectral lines, wherein each spectral line can correspond to a specific energy level transition in an atom. By detecting the presence of spectral lines at specific wavelengths, the presence of an element in the sample can be determined. Furthermore, the intensity of each spectral emission can be used to analyzethe relative concentration of elements within the sample.

As such, an optical spectrometer such as an optical emission spectrometer may generate a plurality of spectral peaks from a sample. Part of the process of analyzing the plurality of spectral peaks involves the identification of spectral peaks from the measurement data. The identification process typically involves fitting one or more curves to the measurement data in order to identify a peak location (and associated wavelength), and a peak intensity. The peak wavelength and intensity can be used to determine the element(s) present in the sample and the relative composition of each element.

In optical spectrometry, spectral peaks generated from a sample may include two or more spectral peaks which have a similar wavelength. Consequently, when the spectral peaks are imaged on the detector, spectral peaks of a similar wavelength may overlap. In some cases, the overlap is a result of the optical spectrometer not having sufficient resolution to distinguish the two spectral peaks. Overlapping spectral peaks can result in an erroneous identification as a result of the interference between the overlapping spectral peaks.

When overlapping spectral peaks occur, a user may elect not to use the overlapping spectral peaks for further analysis. Abandoning the analysis of overlapping spectral peaks increases the time taken to analyze a sample and can involve user input to review the overlapping peaks.

Alternatively, an inter-element correction algorithm can be applied to resolve the overlapping peaks. Performing inter-element correction may be impracticable depending on the measurement circumstances, and can involve additional user effort. The effectiveness of inter-element correction algorithms is also dependent on the resolution of the optical spectrometer. As such, inter-element correction algorithms can be unsuitable for resolving some overlapping peaks.

Accordingly, there is a need for methods for analyzing-spectral peaks that tackles at least one of the problems associated with prior art methods.

SUMMARY

According to a first aspect, a method of analyzing an interfered peak of a sample spectrum generated using a detector of an optical spectrometer is provided. The interfered peak is produced by a plurality of spectral emissions of different wavelengths. The method comprises generating interfered curve parameters representative of the peak shape of each spectral emission in the interfered peak based at least in part on a model of expected curve parameters for the optical spectrometer and a location of the sample peak on the detector of the optical spectrometer. The method also comprises fitting a plurality of curves to the interfered peak, each curve corresponding to one of the plurality of spectral emissions of different wavelengths forming the interfered peak, wherein each curve is fitted using the interfered curve parameters provided by the model of expected peak parameters. The plurality of curves are output for further analysis.

According to the method of the first aspect, a sample spectrum generated using an optical spectrometer, for example an optical emissions spectrometer, may be analyzed. In particular, the method of the first aspect analyzes interfered peaks which are produced by at least two spectral emissions of different wavelengths. The method of the first aspect provides a method for generating interfered curve parameters in order to fit a plurality of curves to an interfered peak. The interfered curve parameters can then be output for further analysis. As such, the method of the first aspect allows the different spectral emissions from interfered peaks to be characterised (e.g. the intensity and peak wavelength of each of the spectral emissions) such that the information from the interfered peaks can be used for further analysis. That is to say, the method of the first aspect allows a user to analyze a greater proportion of the sample spectrum using an analysis process that is straightforward and efficient to implement.

In particular, the method of the first aspect generates curves representative of the peak shape of each spectral emission forming the interfered peak. Such curves can be used to perform a baseline correction for each of the spectral emissions and subsequently calculate a concentration for an element associated with the spectral emission based at least in part on an area under the generated curve. That is to say, methods according to the first aspect allow for interfered peaks to be analyzed to determine concentrations of elements contributing to the interfered peak.

In order to analyze the interfered peak, the method of the first aspect fits curves to the interfered peak. Embodiments of the present disclosure realize that the contribution to the overall shape of the interfered peak from each different spectral emission depends, at least in part, on the optical aberrations introduced by the optical spectrometer as a result of the detector and associated optics. The degree of optical aberration is dependent on the position on the detector of where the interfered peak is detected. The variable nature of the optical aberration makes it challenging to accurately fit curves to an interfered peak. That is to say, an assumption that each spectral emission across the detector has the same peak shape leads to inaccurate analysis due to the nature of the optical aberrations introduced by the optical spectrometer. Similarly, the same wavelength of spectral emission may be imaged at a plurality of locations on the detector. As such, a wavelength-dependent assumption of peak shape may also lead to similar inaccuracies.

In order to accurately fit curves to an interfered peak, the method of the first aspect provides a model of expected curve parameters for the optical spectrometer. The model of expected curve parameters provides interfered curve parameters representative of a peak shape for a spectral emission at a specified detector location. As such, the interfered curve parameters can be used to model a peak shape of a single spectral emission at the detector location (corresponding to a known wavelength). For an interfered peak, the plurality of spectral emissions that make up the interfered peak can be assumed to have similar degrees of optical aberration. For example, the spectral emissions forming an interfered peak may be detected at a similar location of a detector (e.g. within 20 pixels of each other). Accordingly, the spectral emissions forming the interfered peak can be assumed to have the same peak shape (i.e. be represented by the same interfered curve parameters) provided by the model of expected curve parameters.

In some embodiments, the interfered curve parameters for each spectral emission comprise first and second asymmetric interfered curve parameters in order to fit a plurality asymmetric curves to the interfered peak. By using asymmetric curves, the model of expected curve parameters may more accurately account for variations in peak shape due to variations the degree of optical aberration across a detector.

In some embodiments, the first and second interfered curve parameters are respective first and second bi-Gaussian curve parameters. In some embodiments, a bi-Gaussian model of the peak shapes is well-suited to account for the variation in optical aberration with wavelength for an optical spectrometer.

In some embodiments, fitting each of the plurality of curves to the interfered peak comprises selecting a peak wavelength and a peak intensity for each of the curves to be fitted to the interfered peak. As such, the method of the first aspect may optimise the peak wavelength and peak intensity selected for each of the curves to be fitted to the interfered peak.

In some embodiments, the model of expected curve parameters for the optical spectrometer comprises a model defining a relationship between a detector location of the interfered peak and the interfered curve parameters. In some embodiments, the detector location of the interfered peak may be represented by a pixel number.

In some embodiments, the model of expected curve parameters is generated based at least in part on a peak shape and associated detector location of the peaks of a plurality of spectral peaks of a calibration spectrum generated from a calibration sample using the optical spectrometer. By forming the model of expected curve parameters based at least in part on a calibration spectrum generated using the optical spectrometer for which data is to be analyzed, the model may accurately reflect the optical aberration of the optical spectrometer. In other embodiments, the model of expected curve parameters may be provided as a pre-defined model. The pre-defined model may account for known optical aberrations introduced by the optics of the optical spectrometer.

In some embodiments, the method further comprises determining how many curves are to be fitted to the interfered peak. In some embodiments, the number of curves to be fitted to the interfered peak is determined based at least in part on the first derivative and/or the second derivative of the interfered peak. As such, the first and/or second derivative of the sample peak may be used to determine the number of different spectral emissions that generated the interfered peak. Knowledge of the number of spectral emissions, and thus the number of curves to be fitted to the interfered peak, may allow the method to more accurately fit the curves to the interfered peak.

In some embodiments, the peak wavelength for each curve to be fitted to the interfered peak is selected from a database of known spectral emissions. By selecting the peak wavelength for each curve to be fitted to the interfered peak using the wavelengths of the known spectral emissions, the method may fit curves to interfered peaks without prior knowledge of the number of spectral emissions present in the peak. In particular, such fitting methods may be particularly applicable to interfered peaks where it is challenging to distinguish the number of different spectral emissions present.

In some embodiments, the plurality of curves to be fitted to the interfered peak are fitted using a regression-based algorithm.

In some embodiments, the sample spectrum is generated by the optical spectrometer using an echelle grating to diffract sample light on to a two-dimensional detector. As such, the model of expected curve parameters may reflect the variation in optical aberration across the two-dimensional detector. In some embodiments, it will be appreciated that the same wavelength of light may be diffracted to a plurality of locations on the detector. As such, the model of expected curve parameters uses a detector location, rather than wavelength to more accurately predict the peak shape of each spectral emission forming the interfered peak.

In some embodiments, the detector of the optical spectrometer is an array detector. That is to say, the detector comprises a plurality of detection elements (e.g. pixels of a charged coupled device) arranged in an array, wherein each detection element is configured to detect an intensity of the portion of the sample spectrum incident on the detection element. The array may be a one-dimensional array or a two-dimensional array. As such, a location of the interfered peak on the detector (a detector location) may be represented by a pixel number, or a set of co-ordinates. That is to say, the interfered peak may be spatially distributed across a region of the detector.

In some embodiments, the optical spectrometer may be an atomic emission spectrometer. In particular, the optical spectrometer may be an optical emission spectrometer, and the spectrometer controller. The method of the first aspect may also be applied to other types of optical spectrometer (and associated controllers) such as an x-ray fluorescence spectrometry system, a laser-induced breakdown spectrometry system, or an optical absorption spectrometer. As such, it will be appreciated that the method of the first aspect is applicable to any form of spectrometry where interfered peaks are present in a sample spectrum.

According to a second aspect of the disclosure, a controller for analyzing an interfered peak of a sample spectrum generated using a detector of an optical spectrometer is provided. The controller is configured to receive the interfered peak from the optical spectrometer, the interfered peak produced by a plurality of spectral emissions of different wavelengths. The controller is further configured to:
  generate interfered curve parameters representative of the peak shape of each spectral emission in the interfered peak based at least in part on a model of expected curve parameters for the optical spectrometer and a location of the interfered peak on the detector of the optical spectrometer;

fit a plurality of curves to the interfered peak, each curve corresponding to one of the plurality of spectral emissions of different wavelengths forming the interfered peak, wherein each curve is fitted using the interfered curve parameters provided by the model of expected peak parameters; and output the plurality of curves for further analysis.

As such, the controller of the second aspect may be used to perform the method of the first aspect of the disclosure. As such, it will be appreciated that the controller of the second aspect may incorporate any of the optional features, and associated advantages, of the first aspect discussed above.

The controller of the second aspect may be provided using a controller of an optical spectrometry system. In some embodiments, the controller may comprise a processor, microprocessor or the like. In some embodiments, the controller may be a controller for an optical emission spectrometer or an optical emission spectrometry system.

According to a third aspect of the disclosure, an optical spectrometry system is provided. The optical spectrometry system comprises an optical spectrometer configured to generate a sample spectrum from a sample using a detector of the optical spectrometer, and a controller configured to analyze an interfered peak of the sample spectrum, the interfered peak produced by a plurality of spectral emissions of different wavelengths. The controller is configured to:

generate interfered curve parameters representative of the peak shape of each spectral emission in the interfered peak based at least in part on a model of expected curve parameters for the optical spectrometer and a location of the interfered peak on the detector of the optical spectrometer;

fit a plurality of curves to the interfered peak, each curve corresponding to one of the plurality of spectral emissions of different wavelengths forming the interfered peak, wherein each curve is fitted using the interfered curve parameters provided by the model of expected peak parameters; and output the plurality of curves for further analysis.

As such, the optical spectrometry system may comprise the controller of the second aspect. The optical spectrometry system may be configured to perform the method of the first aspect. As such, it will be appreciated that the optical spectrometry system of the third aspect may incorporate any of the optional features, and associated advantages, of the first or second aspects discussed above.

In some embodiments, the optical spectrometry system may be an optical emission spectrometry system comprising an optical emission spectrometer.

According to a fourth aspect of the disclosure, a computer program comprising instructions to cause the optical spectrometry system of the third aspect to execute the steps of the method of the first aspect is provided. As such, it will be appreciated that the computer program of the fourth aspect may incorporate any of the optional features, and associated advantages, of the first, second, or third aspects discussed above.

According to a fifth aspect of the disclosure, a computer-readable medium having stored thereon the computer program of the fourth aspect is provided. As such, it will be appreciated that the computer-readable medium of the fifth aspect may incorporate any of the optional features, and associated advantages, of the first, second, third, or fourth aspects discussed above.

BRIEF DESCRIPTION OF THE DRAWINGS

Embodiments of the present disclosure may be put into practice in a number of ways and specific embodiments are described by way of example only and with reference to the figures in which.

DETAILED DESCRIPTION

Figure 1:
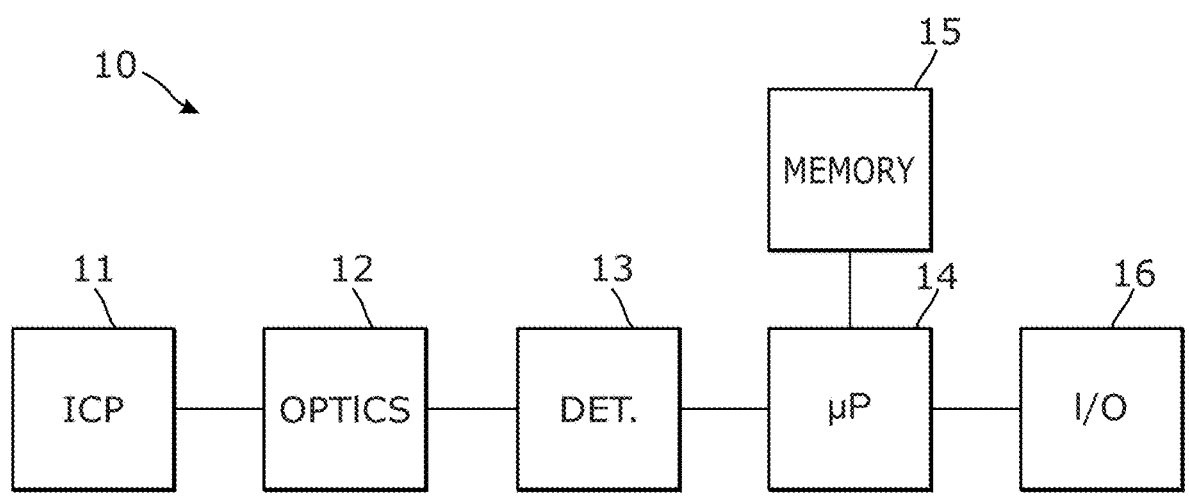
FIG. 1 shows a schematic diagram of an optical spectrometry system according to an embodiment of the disclosure.

According to an embodiment of the disclosure, an optical spectrometry system 10 is provided. The optical spectrometry system 10 is configured to perform a method of optical spectrometry on a sample in order to generate a sample spectrum. The optical spectrometry system 10 may also analyze a sample peak in the sample spectrum according to a method of this disclosure. A schematic diagram of the optical spectrometry system 10 is shown in FIG. 1. As shown in FIG. 1, the optical spectrometry system 10 comprises a light source 11, an optical arrangement 12, a detector 13, a processor (UP) 14, a memory 15, and an input/output (I/O) unit 16.

In the embodiment of FIG. 1, the light source 11 is a plasma source, such as an inductively coupled plasma (ICP) source. As such, the optical spectrometry system 10 of FIG. 1 may be an optical emission spectrometry system 10. In other embodiments, the light source 11 may be a furnace or any other high temperature light source which generates excited species suitable for use in optical emission spectrometry. Alternatively, other optical spectrometry systems 10 may provide a light source 11 suitable for the optical spectrometry method being performed. The light source 11 may be configured to receive a sample to be analyzed using the optical spectrometry system 10. For example, where the light source 11 is a plasma source, a sample may be introduced into the plasma wherein the sample interacts with the plasma. Samples in aqueous form may be introduced directly into the plasma source, while solid samples may be introduced using laser ablation or vaporisation, for example.

In the embodiment of FIG. 1, the optical arrangement 12 may comprise an echelle grating and a prism (and/or a further grating) to produce a two-dimensional image of the light produced by the light source 11 (and sample if present). The two-dimensional image is formed on the detector 13. In such an arrangement, it will be appreciated that the optical arrangement 12 is configured to direct radiation from the light source 11 to the detector such that the radiation is suitable for detection by the detector 13.

In the embodiment of FIG. 1, the detector 13 may be a CCD (charged coupled device) array. A typical CCD array may have at least approximately 1024×1024 pixels (i.e. 1 Megapixel). The CCD array may be arranged for producing spectrum intensity values corresponding with the measured amount of light of the echelle spectrum, and for transferring the spectrum values to the processor 14. As such, the detector 13 may be a multichannel detector that is configured to detect a plurality of different wavelengths. The detector 13 (such as in the embodiment of FIG. 1) may be configured to detect a two-dimensional spectrum. In other embodiments, the detector 13 may be a CMOS or CID detector.

The processor 14 (controller) may comprise a commercially available microprocessor and the like. The memory 15 can be a suitable semiconductor memory and may be used to store instructions allowing the processor 14 to carry out an embodiment of the method according to this disclosure. The processor 14 and memory 15 may be configured to control the optical spectrometry system 10 to perform methods according to embodiments of this disclosure. As such, the memory 15 may comprise instructions which, when executed by the processor 14, cause the optical spectrometry system 10 to carry out methods according to embodiments of this disclosure.

The optical spectrometry system 10 may be configured to generate a sample spectrum by introducing the sample to the light source 11. The light generated by the light source 11 interacts with the sample wherein spectral emissions that are characteristic of the sample are emitting by the sample. The spectral emissions from the light source 11 and the sample are directed by the optical arrangement 12 to the detector 13. The echelle grating of the optical arrangement 12 diffracts the spectral emissions of different wavelengths by varying amounts such that peaks associated with each spectral emission are detected at different locations on the detector 13.

Figure 2:
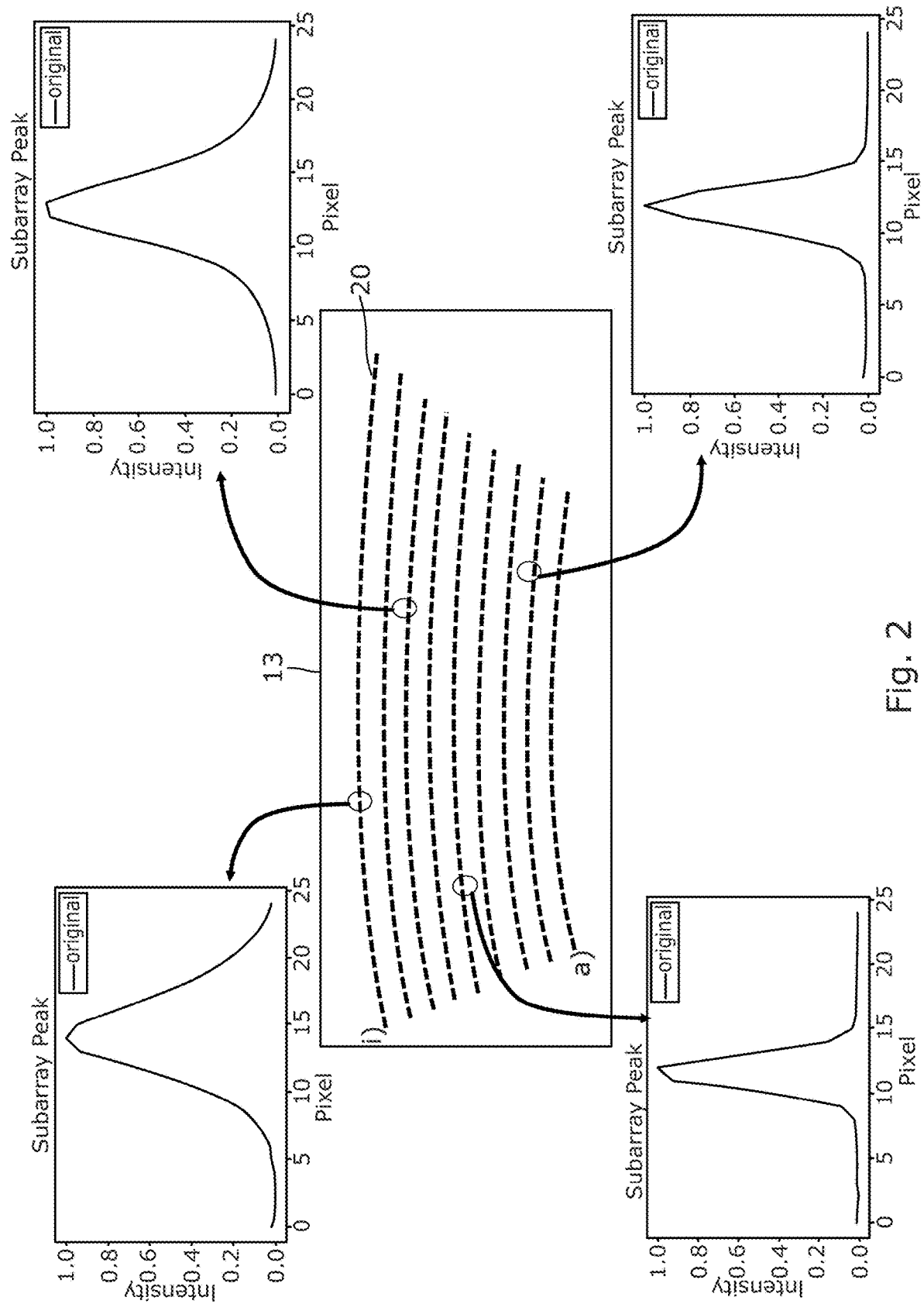
FIG. 2 shows a schematic diagram of a detector of an optical spectrometry system according to an embodiment of the disclosure.

FIG. 2 shows a schematic diagram of two-dimensional detector 13 of the embodiment of FIG. 1. The two-dimensional detector 13 of FIG. 2 is formed from an array of pixels, although each pixel is not individually represented in FIG. 2. FIG. 2 includes schematic representations (dashed lines) of the orders of light 20 diffracted by the echelle grating and prism which are imaged on the detector 13. Each order 20 corresponds to a different wavelength range, and the wavelength varies in the transverse direction along each order. For example, in the embodiment of FIG. 2, the wavelength of light diffracted may increase along each order from left to right. The starting wavelength may also increase from order a) up to order i). FIG. 2 also shows four detailed views of example single spectral emissions that are imaged by groups of pixels of the detector at different locations on the detector. It will be appreciated that the peak shape of each of the spectral emissions differs based at least in part on the optical aberration of the optical arrangement 12. In some embodiments, the optical arrangement 12 may cause a certain wavelength of light to be diffracted to a single location, or a plurality of locations on the detector 13. As such, in some embodiments, a spectral emission may appear in multiple locations on the detector 13.

Where two spectral emissions have a similar wavelength, the peak associated with each spectral emission may be directed to a similar region of the detector 13. Where two spectral emissions are directed to regions of the detector 13 such that at least a portion of one spectral emission peak overlaps with another peak of another spectral emission, the individual peaks can be challenging to resolve individually. These peaks are known as interfered peaks.

The detector 13 is configured to output the recorded intensity of each pixel of the detector 13 to the processor 14 for further analysis.

Figure 3:
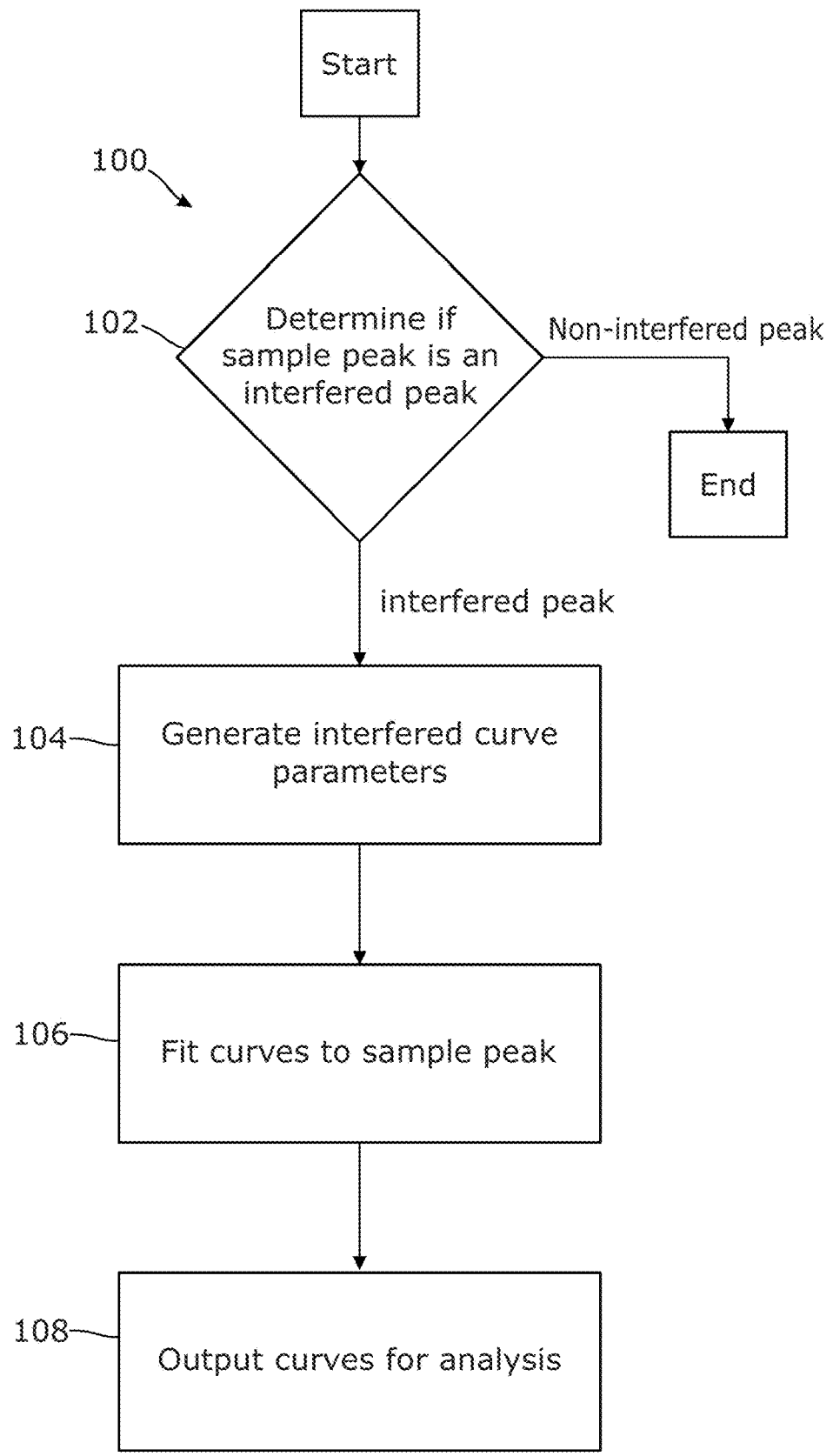
FIG. 3 shows a block diagram of a method of analyzing a spectral peak of a sample spectrum according to an embodiment of the disclosure.

Next, a method 100 of analyzing a spectral peak of a sample spectrum will be described with reference to FIG. 3. FIG. 3 shows a block diagram of the method 100. The method 100 may be performed by the processor of the optical spectrometry system 10. Alternatively, the method 100 may be performed by any other processor that is provided with the sample spectrum generated by the optical spectrometry system 10.

In step 102 of the method 100, the processor 14 determines if a sample peak of the sample spectrum is an interfered peak. The sample spectrum may comprise a plurality of peaks generated from spectral emissions of the optical spectrometry system 10. Interfered peaks are the result of two or more spectral emissions falling incident on the same region of the detector. That is to say, the peaks from two or more spectral emissions fall within about 20 pixels (of the detector) of each other such that at least a portion of the peak associated with each spectral emission overlaps with one or more other peaks of other spectral emissions.

Figure 4:
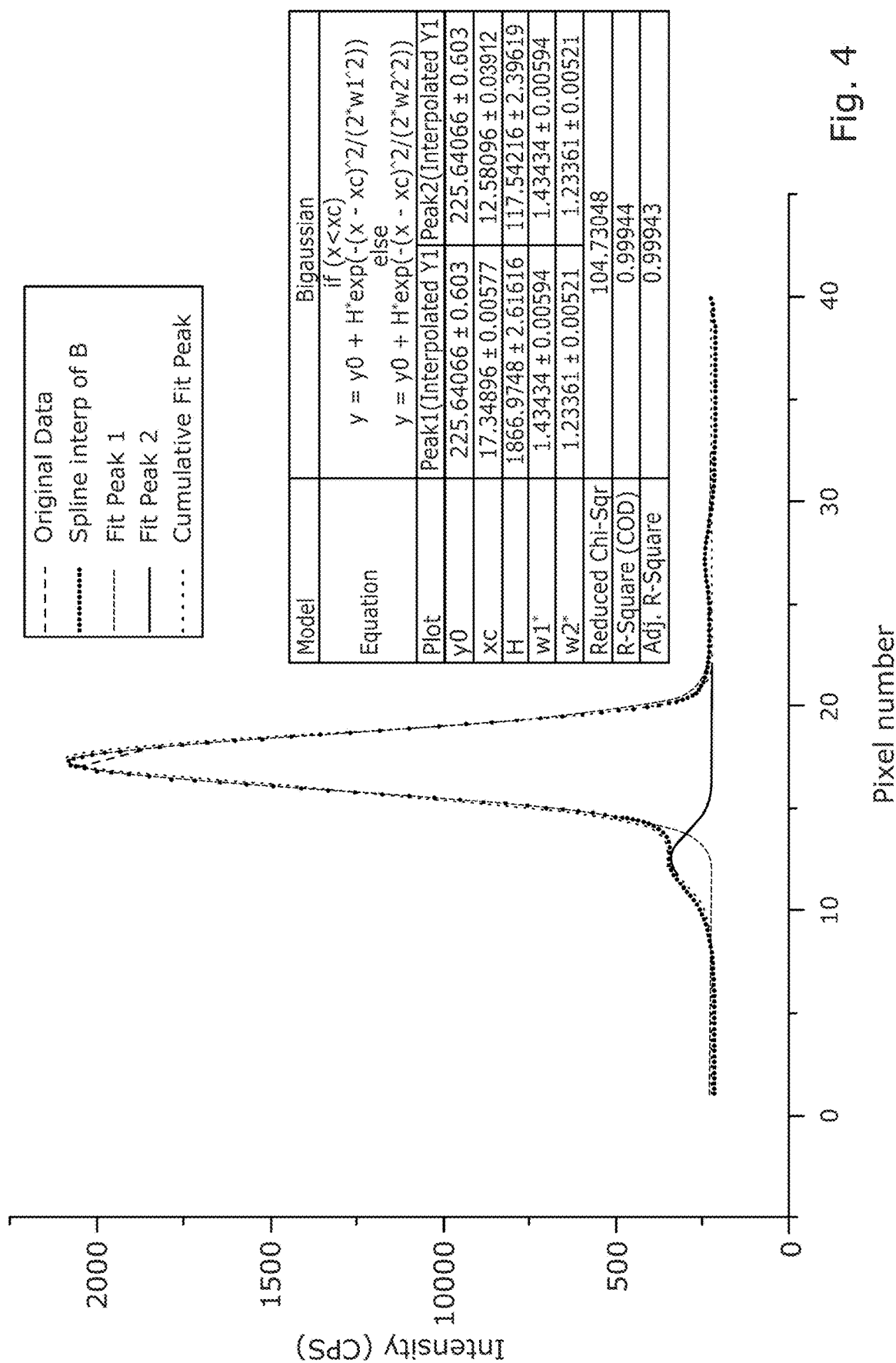
FIG. 4 shows an example of an interfered peak resulting from two spectral emissions, wherein the peak amplitude of the interfered peak does not correspond (in wavelength) to the peak wavelength of the two underlying spectral emissions.

FIG. 4 shows an example of an interfered peak that may be analyzed according to embodiments of the disclosure. FIG. 4 shows an example of an interfered peak resulting from two spectral emissions, wherein the peak amplitude of the interfered peak does not correspond (in wavelength) to the peak wavelength of the two underlying spectral emissions. The peak intensity of the interfered peak is also different to the peak intensity of the two underlying spectral emissions. As such, the underlying spectral emissions may differ quite significantly from the shape of the interfered peak. Methods according to the present disclosure aim to provide a robust method for analyzing interfered peak which can analyze a variety of different interfered peak shapes.

FIG. 4 is a graph of the intensity values measured by the pixels of the detector along one order. The measurement values shown in FIG. 4 have been interpolated. The interpolation may comprise a cubic spline interpolation, preferably a cubic Hermite interpolation, or a Gaussian interpolation. In some embodiments, a bicubic spline interpolation may be used. The cubic spline interpolation curve is also shown in FIG. 4. While spline interpolation is used in the example of FIG. 4, it will be appreciated that other interpolations known to the skilled person may also be suitable.

In method 100, the interfered peaks shown in FIG. 4 may be distinguished from other peaks in the sample spectrum by analyzing the first derivative of the sample spectrum. In the example of FIG. 4, the first derivative of the interpolated spectrum is analyzed. Sample peaks of the sample spectrum resulting from a single spectral emission may be distinguished from interfered peaks based at least in part on, for example, the number of turning points (i.e. stationary points) within a specified range of the detector (e.g. 15, 20 or 25 pixels, although the actual number of pixels in the specified range can depend on the dimensions of the pixels and the optical characteristics of the optical spectrometry system).

Based at least in part on the number of turning points present, the method may determine the number of different spectral emissions forming the interfered peak. In some embodiments, the second derivative of the sample spectrum may also be analyzed to determine if a peak of the sample spectrum is an interfered peak. In the embodiment of FIG. 4, the second derivative of the interpolated peak may be analyzed, along with the first derivative, to determine if the peak is an interfered peak. The determination of an interfered peak may be based at least in part on the number of peaks indicated by the second derivative and whether the extrema are positive or negative.

For each different spectral emission present in the interfered peak, the method 100 attempts to fit a curve to the interfered peak which is representative of the spectral emission. As such, if the first derivative (and optionally the second derivative) of the sample spectrum indicates that two different spectral emissions are present in the interfered peak, the method 100 can subsequently fit two curves to the interfered peak.

In other embodiments of the disclosure, the method may proceed to fit curves to the interfered peak using an iterative process. As such, methods according to this disclosure can proceed to analysis without prior determination of the number of spectral emissions present in the interfered peak.

If an interfered peak is detected, the method 100 moves on to step 104 where interfered curve parameters are generated for the interfered peak using a model of expected curve parameters. The model of expected curve parameters generates interfered curve parameters which define a shape (e.g. a deviation) of the or each curve to be fitted to the interfered peak. Embodiments of the present disclosure account for circumstances where the detector location dependent optical aberration introduced by e.g. the optics arrangement 14, causes the peak shape of a spectral peak to vary depending on the detector location of the interfered peak to be analyzed. Thus, as part of improving the accuracy of the curve fitting, the model of expected curve parameters can provide interfered curve parameters which account for detector location dependent optical aberrations of the optical spectrometry system 10.

Figure 5:
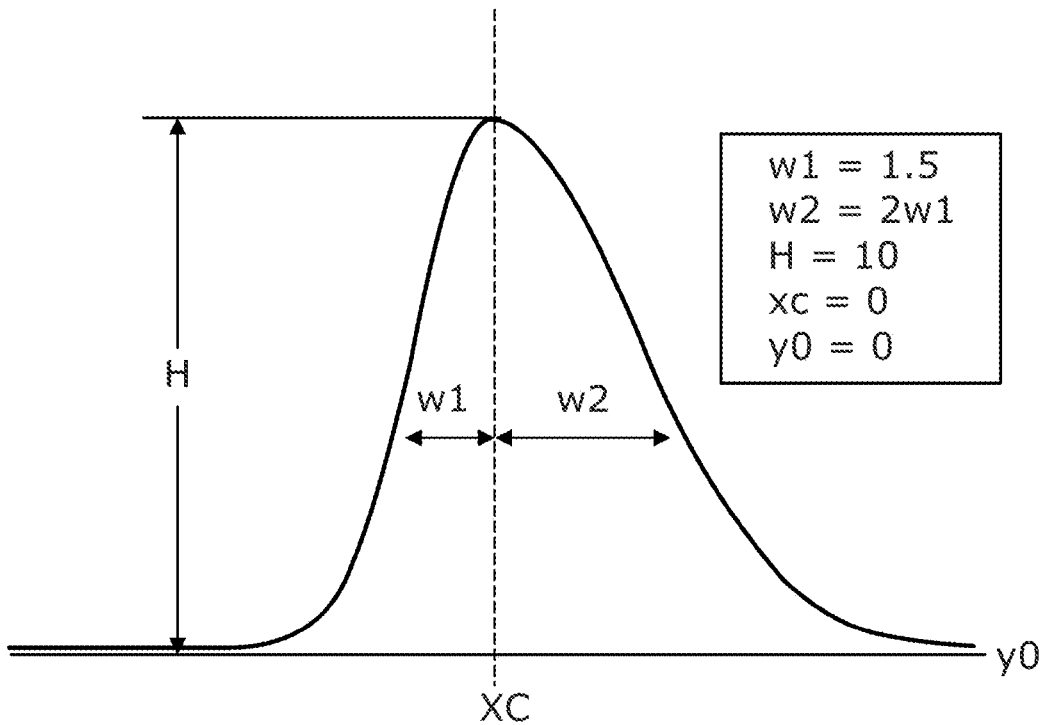
FIG. 5 shows an explanatory diagram of a bi-Gaussian distribution.

In the embodiment of FIG. 4, the model of expected curve parameters assumes that each spectral emission detected by the optical spectrometry system 10 has a bi-Gaussian peak shape. An example of a bi-Gaussian peak is shown in FIG. 5. As shown in FIG. 5, a bi-Gaussian peak can be defined with the equations 1) and 2) below:

$$y = y_0 + He^{-0.5\left(\frac{x-x_c}{w_1}\right)^2} \quad (x < x_c) \quad 1)$$

$$y = y_0 + He^{-0.5\left(\frac{x-x_c}{w_1}\right)^2} \quad (x \geq x_c) \quad 2)$$

In the above equations 1) and 2), y is the intensity of the spectral emission, $y_0$ is the background intensity, H is the amplitude of the spectral peak, and $x_c$ is the detector location (corresponding to a wavelength) at which the maximum of the peak occurs. The interfered curve parameters $w_1$ and $w_2$ define the deviation of the bi-Gaussian distribution on either side of the peak. As such, the interfered curve parameters $w_1$ and $w_2$ determine the shape of the peak for the bi-Gaussian distribution.

As noted above, the optical arrangement 12 introduces an optical aberration which affects the shape of each spectral peak detected by the detector 13. For the embodiment of FIG. 1, the optical aberration introduced by the optical arrangement 12 causes the shape of the spectral peaks to vary across the two-dimensional detector 13. Accordingly, the model of expected curve parameters may define values for the interfered curve parameters $w_1$ and $w_2$ for a range of different detector locations (having an associated wavelength). For example, where the detector is a two-dimensional detector, the model of expected curve parameters may define interfered curve parameters $w_1$ and $w_2$ for each pixel (or regions of pixels) of the detector. As such, the model of expected curve parameters may be provided with a wavelength (x) of the interfered peak (for example the wavelength at the maximum intensity of the interfered peak) and return interfered curve parameters $w_1$ and $w_2$ to be used to fit curves to the interfered peak.

As discussed above, the model of expected curve parameters provides interfered curve parameters $w_1$ and $w_2$ which can be used to fit bi-Gaussian curves to the interfered peak. The interfered curve parameters vary with wavelength/detector location in order to account for the optical aberration present in the optical spectrometry system 10. In order to more accurately account for the optical aberration, in some embodiments the model of expected curve parameters may be generated based at least in part on peak shapes of a plurality of spectral peaks of a calibration spectrum generated from a calibration sample using the optical spectrometer.

The calibration spectrum may be generated by using the optical spectrometry system 10 to analyze a calibration solution. The calibration solution may comprise one or more known elements having known spectral emissions. In some embodiments, the calibration solution may be selected to provide a plurality of non-interfered peaks which are well-distributed across the detector. For example, the calibration solution may comprise one or more transition metal elements, which produce a plurality of spectral emissions across a broad range of wavelengths.

Figure 6:
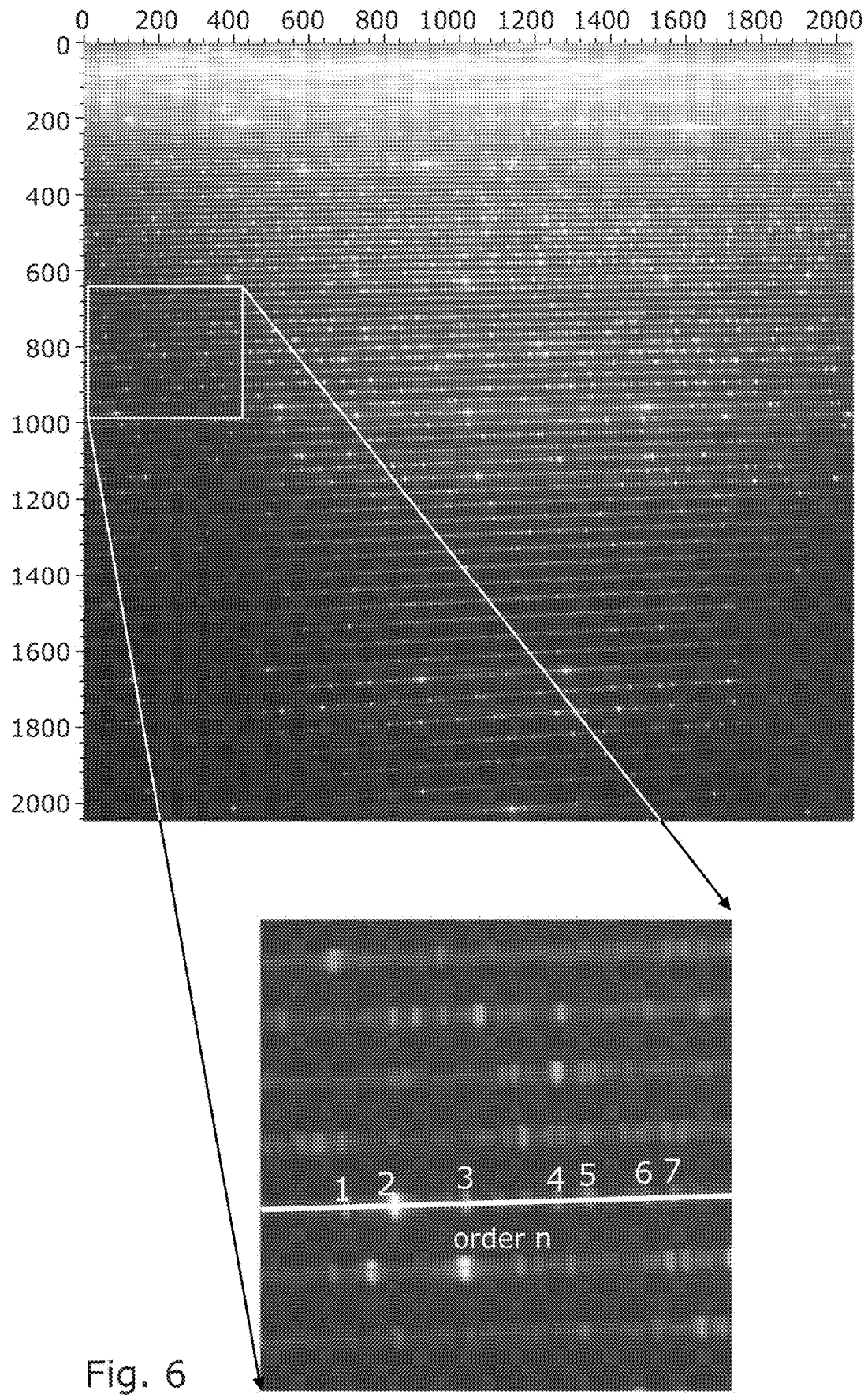
FIG. 6 shows an image of a calibration spectrum recorded by an optical spectrometry system according to an embodiment of the disclosure.

FIG. 6 shows an image of a calibration spectrum generated using the detector 13 of the optical spectrometry system 10. Similar to the diagram shown in FIG. 2, the image comprises orders of light diffracted by the echelle grating and prism which are imaged on the detector. Each order corresponds to a different wavelength range, and the wavelength varies in the transverse direction along each order. A section of the image is magnified in the detailed view shown in FIG. 6. Along one order n in the magnified view, a number of non-interfered peaks are identified, labelled 1, 2, 3, 4, 5, 6, 7.

Figure 7:
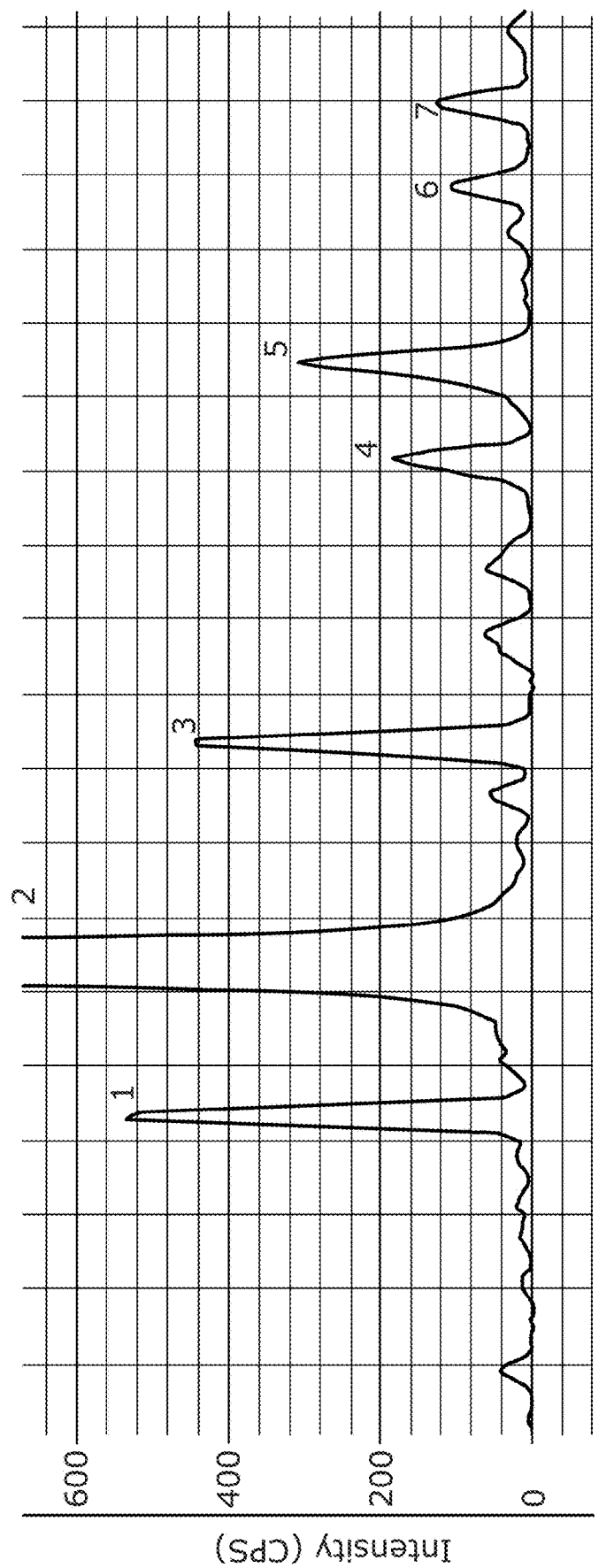
FIG. 7 shows a graph of a region of the calibration spectrum imaged in FIG. 6.

FIG. 7 shows a graph of the intensity values recorded by the pixels along the order depicted in FIG. 6. The peaks in FIG. 7 are labelled with numbers to indicate the corresponding intensity peaks shown in the image of FIG. 6. The peak labelled 2 is not shown in its entirety in FIG. 7, as is it of a substantially larger magnitude of intensity to the other peaks shown in FIG. 7. Where the calibration solution comprises one or more known elements, a list of expected non-interfered peaks may be provided which allows non-interfered peaks to be selected/identified from the calibration spectrum. Alternatively, the processor can identify the non-interfered peaks by analyzing the first and second derivatives of the calibration spectrum.

As shown in FIG. 7, the plurality of calibration peaks are depicted as continuous spectrum, as shown by the continuous line. The processor may fit bi-Gaussian curves to each of the non-interfered peaks using a regression-based algorithm (e.g. minimisation of squared errors). The processor may then record the shape parameters for each of the calibration peaks (in this example the fitted curves are bi-Gaussian and so the shape parameters are $w_1$ and $w_2$) and the corresponding detector location of the calibration peak. Accordingly, a model of expected curve parameters may be generated for the different detector locations which is independent of the intensity of the peaks in the calibration spectrum.

Accordingly, the processor 14 generates the model of expected curve parameters based at least in part on peak shapes of a plurality of spectral peaks of the calibration spectrum generated from the calibration sample using the optical spectrometer. That is to say, the processor 14 calculates the $w_1$ and $w_2$ parameters for each of the non-interfered peaks of the calibration spectrum, and records the detector location associated with each non-interfered peak. The calibration information may be recorded in a database, lookup table, or the like. As such, a database may be generated which records the expected curve parameters $w_1$ and $w_2$ for a given detector location based at least in part on the non-interfered peaks of the calibration spectrum.

It will be appreciated that the calibration spectrum will not provide expected curve parameters for every pixel value. As such, in some embodiments, the database may be used to lookup the nearest pixel for which calibration information is recorded (nearest calibrated pixel). Alternatively, interpolation may be used to generate values for $w_1$ and $w_2$ for each pixel. Preferably, the model of expected curve parameters includes a calibration peak within no greater than 100 pixels distance of a detector location of interest. More preferably, the model of expected curve parameters should provide a calibration peak within no greater than: 70, 50, 30, 25 or 20 pixels distance of a detector location of interest. Accordingly, the model of expected curve parameters may provide an accurate estimate of the optical aberration introduced by the optical spectrometry system 10 (either by interpolation or nearest calibrated pixel), thereby allowing the interfered peak to be analyzed.

Thus, when the processor 14 analyzes an interfered peak, the model of expected curve parameters provides interfered curve parameters $w_1$ and $w_2$ based at least in part on the detector location, or wavelength of the interfered peak. For example, the interfered curve parameters $w_1$ and $w_2$ may be selected based at least in part on the peak wavelength (highest intensity pixel) of the interfered peak. Alternatively, the interfered curve parameters may be selected based at least in part on a central pixel of the interfered peak. As the plurality of curves to be fitted to the interfered peak were detected by the detector in a similar position (i.e. within, for example, about 20 pixels of each other), it can be assumed that the peak associated with each of the plurality of spectral emissions has the same peak shape. As such, the same interfered curve parameters $w_1$ and $w_2$ can be used for each curve to be fitted to the interfered peak.

When fitting bi-Gaussian curves to the interfered peak, the model of expected curve parameters provides the processor with the parameters $w_1$ and $w_2$ based at least in part on the wavelength of the interfered peak. The method then moves on to step 106 where the processor 14 fits a plurality of curves to the interfered peak. The number of curves to be fitted corresponds to the number of spectral emissions detected by the processor when analyzing whether the sample curve is an interfered curve in step 102.

In step 106 of method 100, each curve to be fitted to the interfered peak is a bi-Gaussian curve having the general shape discussed above in equations 1) and 2) (see also FIG. 7).

When fitting curves to the interfered peak, the background ($y_0$) can be removed (assuming the optical spectrometry system 10) is appropriately calibrated. The parameters $w_1$ and $w_2$ are provided by the model. Thus, processor 14 aims to fit the remaining parameters (H and $x_c$) to the interfered peak for each spectral emission present.

Various methods for fitting the curves to the interfered peak may be used. For example, a regression-based fitting algorithm may be used to fit the plurality of curves to the interfered peak. The curves shown in FIG. 4 are fitted using a least squares minimization algorithm. As such, the fitting algorithm aims to select values for H and $x_c$ for each of the curves to be fitted in order to minimise the squared error between the sum of the fitted curves and the interfered peak.

In the example of FIG. 4, the processor 14 has previously determined that two curves are to be fitted to the interfered peak, each curve corresponding to a different spectral emission. Accordingly, the processor 14 attempts to fit two curves to the interpolated interfered curve. Fitting curves to the interpolated interfered curve may further improve the accuracy of the curve fitting process. The processor retrieves interfered curve parameters from the model of expected curve parameters, based at least in part on the detector location of the interfered peak. In the embodiment of FIG. 4, the detector location of the interfered peak may be determined based at least in part on the pixel with the maximum intensity. In other embodiments, the pixel corresponding to a centroid of the interfered peak may be used as the detector location of the interfered peak. Thus, in the example of FIG. 4, the model of expected curve parameters generates interfered curve parameters $w_1$=1.43434 and $w_2$=1.23361 to be used to fit curves to the interfered peak.

As shown in FIG. 4, first and second curves are fitted to the interfered peak. As shown in FIG. 4, each of the first and second curves has a bi-Gaussian shape. As explained above, the same interfered curve parameters $w_1$=1.43434 and $w_2$=1.23361 are used for the first and second curves. The fitting algorithm fits a first curve where $x_c$=17.34896 and H=1866.9748, and a second curve where $x_c$=12.58096 and H=117.54216. In FIG. 6, the horizontal axis shows a nominal pixel number of the detector. It will be appreciated that the pixel number is representative of a wavelength, and so a peak wavelength associated with each of the first and second curves can subsequently be calculated by the processor 14.

FIG. 4 also shows a cumulative plot of the first and second curves. It will be appreciated that the cumulative plot provides an accurate fit to the original data, indicating that the first and second curves are accurate representations of the two spectral lines forming the interfered peak. For example, as shown in FIG. 4, the adjusted $R^2$ value for the curve fitting is 0.99943, indicating that the two curves accurately fit the original data.

Figure 8:
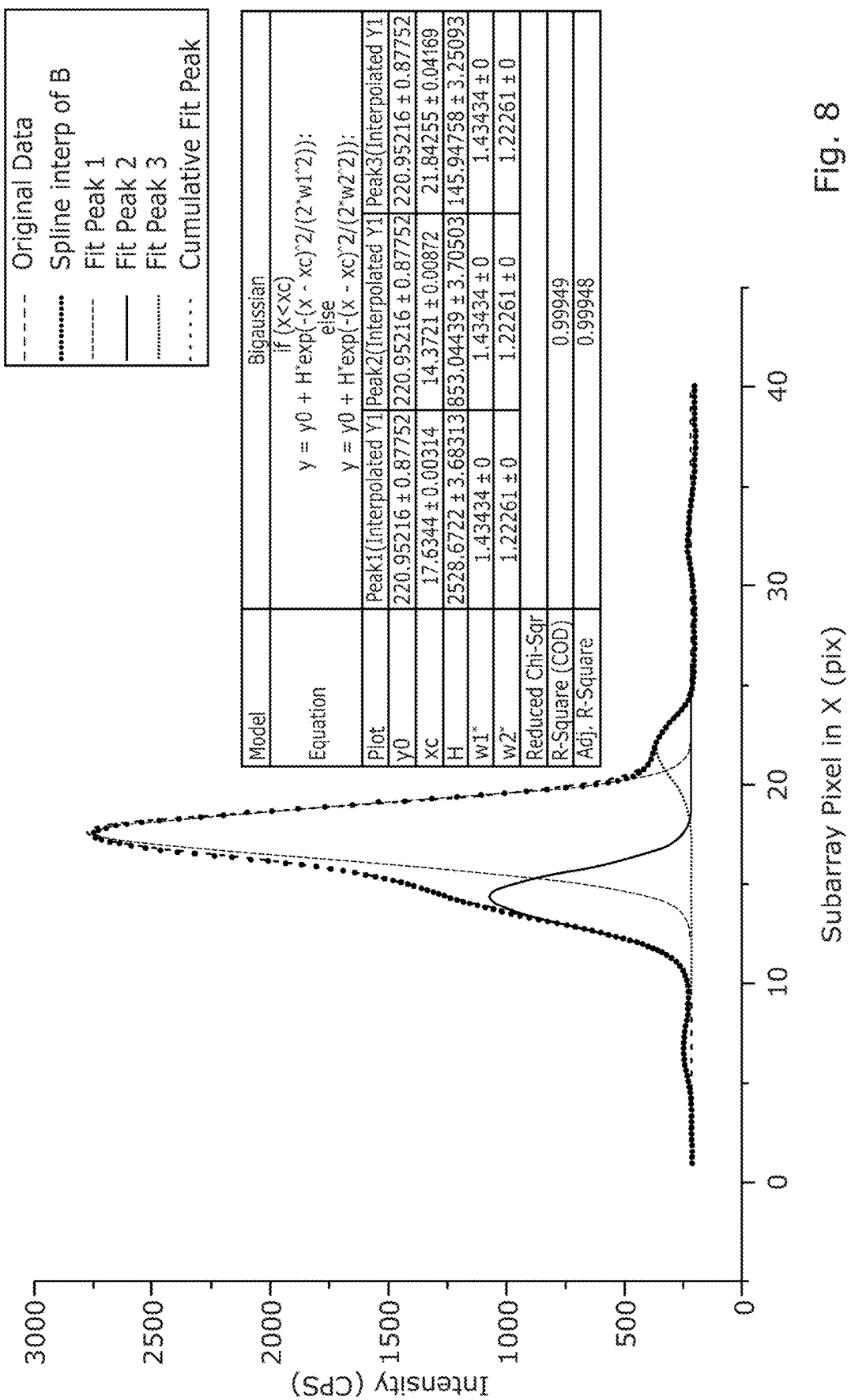
FIG. 8 shows an example of an interfered peak resulting from three spectral emissions.

FIG. 8 shows a further example of an interfered peak produced by three different spectral emissions. As shown in FIG. 8, the interfered peak was detected by (roughly) pixels 10 to 25 shown in FIG. 8. As the interfered peak extends across less than around 20 pixels, it can be assumed that the spectral emissions have about the same optical aberration, and so the same interfered curve parameters $w_1$=1.43434 and $w_2$=1.22261 can be used for each of the three curves to be fitted. In accordance with the embodiments of this disclosure, the interfered curve parameters are provided by the model of expected curve parameters, based at least in part on the wavelength (pixel location) of the interfered peak. As shown in FIG. 8, first, second and third curves are fitted to the interfered peak, each curve corresponding to a spectral emission present in the interfered peak. The first, second, and third curves may be fitted using a regression-based algorithm as discussed above in relation to FIG. 6. As shown in FIG. 8, the fitting algorithm fits a first curve where $x_c$=17.6344 and H=2528.6722, a second curve where $x_c$=14.3721 and H=853.04439, and a third curve where $x_c$=21.84255 and H=145.94758. The adjusted $R^2$ value for the curve fitting is 0.99948, indicating that the three curves accurately fit the original data.

Once the curves are fitted to the data, in step 108 the method 100 may output the fitted curves for further analysis. For example, the parameters H and $x_c$ may be output in order to allow the individual spectral peaks of the interfered peak to be identified and quantified.

FIGS. 4-7, and FIG. 8 provide examples of methods of analyzing an interfered peak wherein the number of interfering spectral emissions is known, or determined, prior to the fitting analysis. In some embodiments of the disclosure, the method may iteratively fit curves to an interfered peak.

Figure 9:
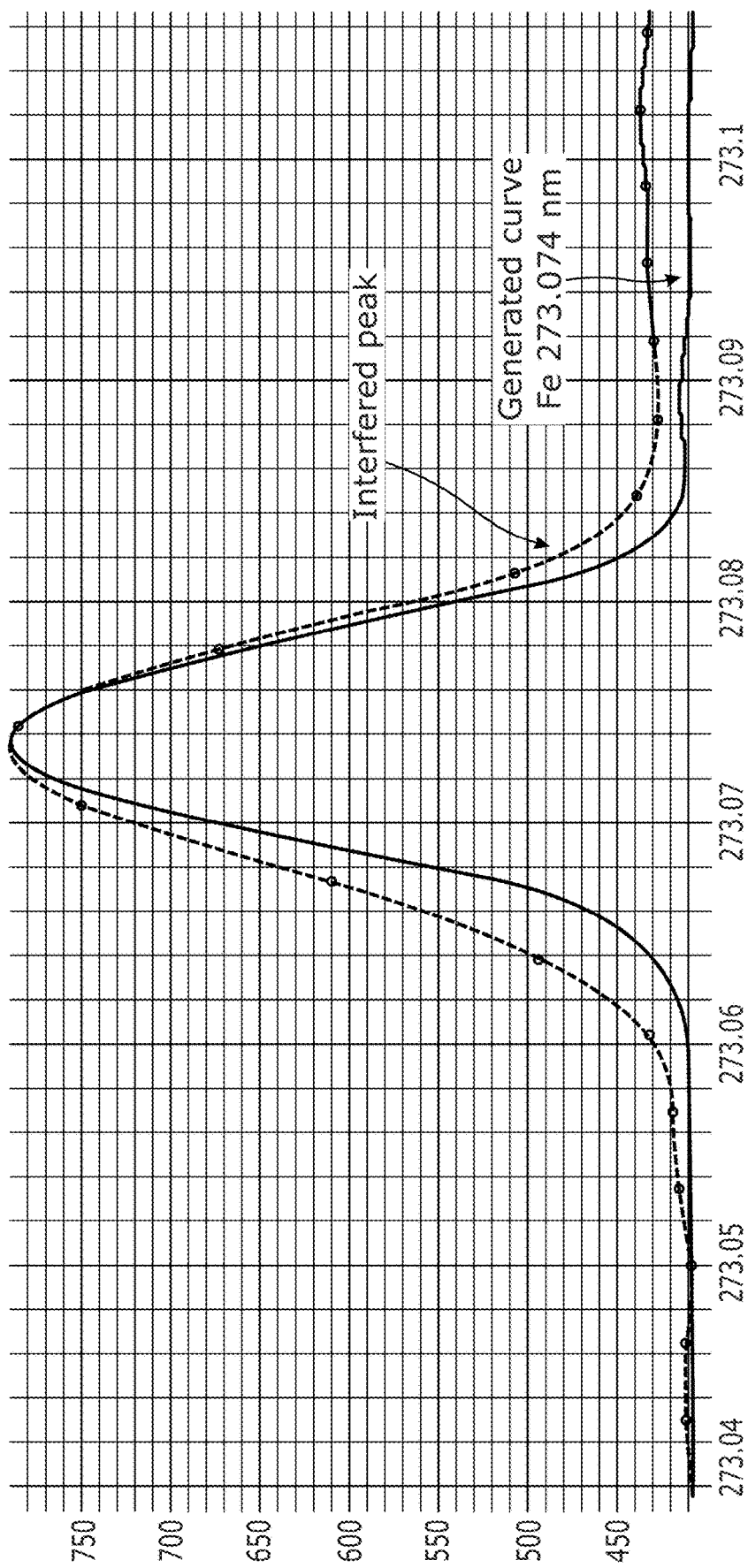
FIG. 9 shows a further example of a method of analyzing an interfered peak according to an embodiment of the disclosure.

FIG. 9 shows a graph of a spectral peak detected by the optical spectrometry system 10. On first glance, the spectral peak does appear to have any features such as turning points (stationary points) that are indicative that the peak is an interfered peak. However, when attempting to generate a curve to analyze the spectral peak using the expected curve parameters for the corresponding detector location, it can be seen that the spectral peak is of a different shape to the expected shape for a non-interfered peak. That is to say, the peak is actually an interfered peak wherein the two or more peaks of the interfering spectral emissions have not been resolved by the optical spectrometry system 10. In such cases, it can be difficult to identify the $x_c$ values for each curve to be generated for the interfered peak.

In accordance with a second embodiment of the disclosure, the peak wavelength for each curve to be fitted to the interfered peak is selected from a database of known spectral emissions. Thus, the database may provide a selection of peak wavelengths ($x_c$) which can be used to generate curves for the interfered peak.

The database may be used to provide $x_c$ values for one or more of the curves to be fitted to the interfered peak. In some embodiments, the $x_c$ values to be used may be selected in advance of a curve generation process by a user. For example, a user may have a priori knowledge of likely spectral emissions present in the sample used to generate the interfered peak (thus allowing some spectral emissions to be targeted and others discounted). Alternatively, the processor 14 may select $x_c$ values for each curve to be generated which provide the closest match to the interfered peak. As such, in some embodiments the processor may iteratively fit curves to the interfered peak by reference to a database of known spectral peaks. One example of a suitable database of known spectral peaks is the National Institute of Standards and Technology (NIST) Atomic Spectra Database, NIST Standard Reference Database #78.

Figure 10:
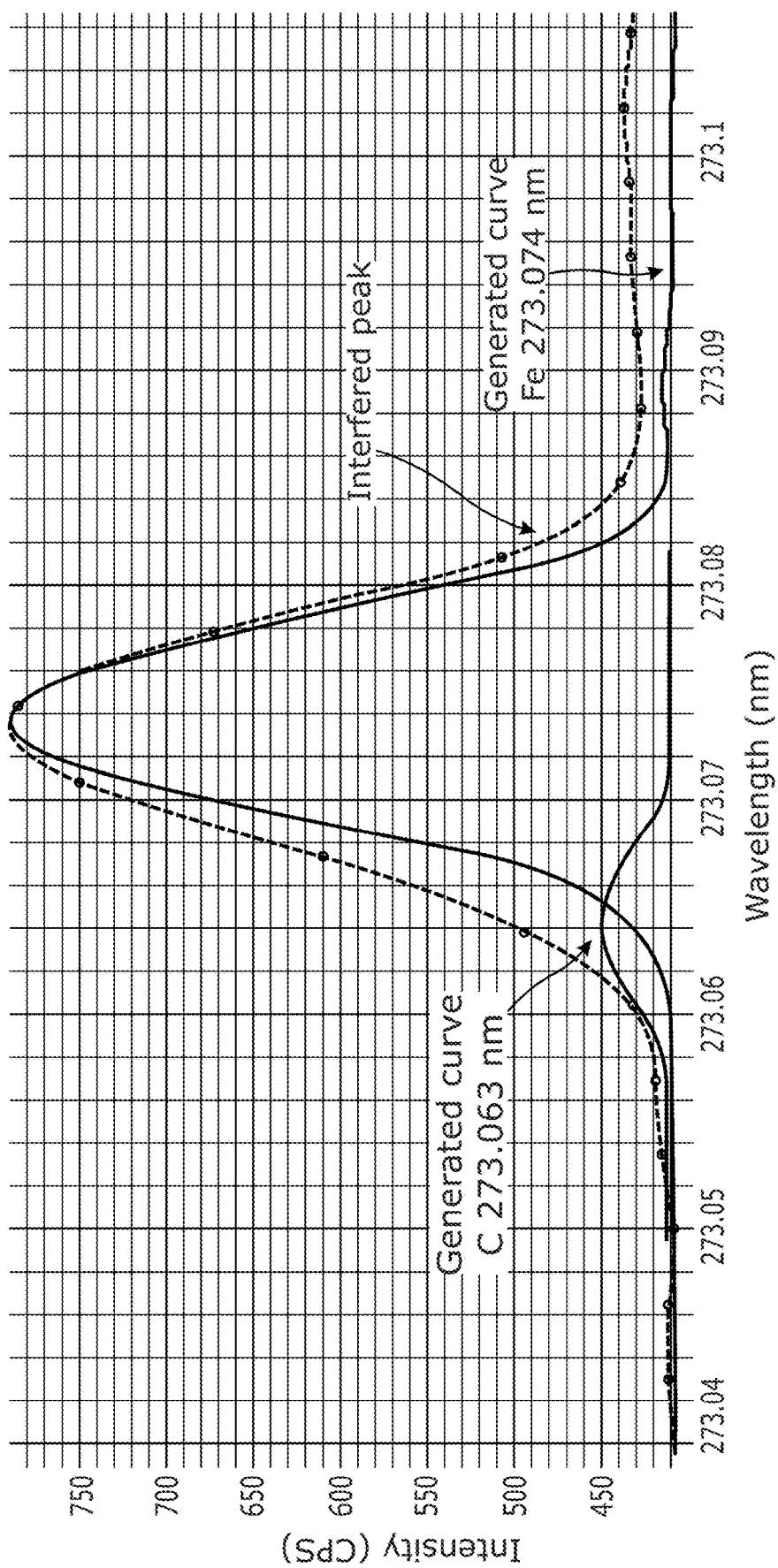
FIG. 10 shows a plurality of curves fitted to the interfered curve of FIG. 9.

An example of this fitting process is shown in FIGS. 9 and 10. FIGS. 9 and 10 each show a graph of an interfered peak produced by a sample comprising iron (Fe) and carbon (C). Accordingly, the interfered peak is substantially a product of the 273.074 nm spectral emission from iron and the 273.063 nm spectral emission from C (i.e. other spectral emissions may be present in the peak at low levels).

As shown in FIGS. 9 and 10, the method iteratively generates curves to fit to the interfered peak using the interfered curve parameters and a peak wavelength selected from the database of know spectral emissions. As discussed above, the method may select interfered curve parameters for the curves to be fitted based at least in part on the detector location of the interfered peak (i.e. the detector location corresponding to the peak intensity value of the interfered peak). For each curve fitted, the method attempts to minimise the error between the interfered peak and the sum of the fitted curves. Table 1 below shows a portion of a database of spectral peaks which may be used to perform the curve generation shown in FIGS. 9 and 10.

TABLE 1

| Analyte | Peak wavelength (nm) |
|---|---|
| Li | 273.055 |
| OS | 273.061 |
| C | 273.063 |
| Hf | 273.071 |
| Ta | 273.073 |
| Fe | 273.074 |
| Ti | 273.085 |
| Ru | 273.093 |

Based at least in part on the database of spectral peaks shown in Table 1, the processor 14 may select a peak corresponding to Fe-273.074 nm as the x, value which provides the lowest error between the curve and the interfered peak for a single curve. The processor 14 then scales the intensity of the first curve in order to minimise the error between the first curve and the interfered peak. FIG. 9 shows a graph of the first curve generated for the interfered peak.

FIG. 10 shows a graph of the first and second curves fitted to the interfered peak. For the second peak, the processor may iteratively fit curves based at least in part on different peak wavelengths in the database. As shown in FIG. 10, a curve corresponding to C-273.063 nm may be generated as a second curve. Thus, the method may iterate through the wavelengths in the database of spectral peaks in order to arrive at the best fit (minimisation of errors) for each curve fitted to the interfered peak. The method may use a regression-based fitting algorithm, similar to those discussed above, to generate the curves for the interfered peak.

Accordingly, as shown in FIG. 10, the contributions to the interfered peak from Fe and C may be separately resolved, allowing the interfered peak to be further analyzed.

Thus, according to embodiments of this disclosure, a method of analyzing a sample peak in a sample spectrum is provided. The method may be performed by an optical spectrometry system in order to analyze interfered peaks detected by the optical spectrometry system. In particular, the method may be performed by an optical emission spectrometry system. As such, the method and systems of this disclosure allow spectral emissions from interfered peaks to be characterised such that the information from the interfered peaks can be used for further analysis. Accordingly, the method and systems of this disclosure allow a user to analyze a greater proportion of a sample spectrum using an analysis process that is straightforward and efficient to implement.

It will be understood by those skilled in the art that the disclosure is not limited to the embodiments shown and that many modifications and additions can be made without departing from the scope of the present disclosure as defined in the appended claims.

The invention claimed is:

1. A method of analyzing an interfered peak of a sample spectrum generated using a detector of an optical spectrometer, the interfered peak produced by a plurality of spectral emissions of different wavelengths, the method comprising:
   generating interfered curve parameters representative of a peak shape of each spectral emission in the interfered peak based at least in part on a model of expected curve parameters for the optical spectrometer and a location of the interfered peak on the detector of the optical spectrometer;

fitting a plurality of curves to the interfered peak, each curve corresponding to one of the plurality of spectral emissions of different wavelengths forming the interfered peak, wherein each curve is fitted using the interfered curve parameters provided by the model of expected curve parameters; and outputting the plurality of curves for further analysis.

2. The method of claim 1, wherein
the interfered curve parameters comprise first and second asymmetric interfered curve parameters in order to fit a plurality of asymmetric curves to the interfered peak.

3. The method of claim 2, wherein the interfered curve parameters are first and second bi-Gaussian curve parameters.

4. The method of claim 1, wherein the model of expected curve parameters for the optical spectrometer defines a relationship between a central wavelength of the interfered peak and the interfered curve parameters.

5. The method of claim 1, wherein:
the model of expected curve parameters is generated based at least in part on peak shapes and associated detector locations of a plurality of spectral peaks of a calibration spectrum generated from a calibration sample using the optical spectrometer.

6. The method of claim 1, wherein
the sample spectrum is generated by the optical spectrometer using an echelle grating to diffract sample light on to a two-dimensional detector.

7. The method of claim 1, wherein
fitting each of the plurality of curves to the interfered peak comprises selecting a peak wavelength and a peak intensity for each of the curves to be fitted to the interfered peak.

8. The method of claim 1, further comprising
determining how many curves to be fitted to the interfered peak.

9. The method of claim 8, wherein
the number of curves to be fitted to the interfered peak is determined based at least in part on the first derivative and/or the second derivative of the interfered peak.

10. The method of according to claim 1, wherein
the peak wavelength for each curve to be fitted to the interfered peak is selected from a database of known spectral emissions.

11. The method of claim 1, wherein
the plurality of curves to be fitted to the interfered peak are fitted using a regression-based algorithm.

12. The method of claim 1, wherein
the detector of the optical spectrometer is an array detector.

13. An optical spectrometry system comprising:
an optical spectrometer configured to generate a sample spectrum from a sample using a detector of the optical spectrometer;
a controller configured to analyze an interfered peak of the sample spectrum, the interfered peak produced by a plurality of spectral emissions of different wavelengths, the analysis comprising:
generating interfered curve parameters representative of the peak shape of each spectral emission in the interfered peak based at least in part on a model of expected curve parameters for the optical spectrometer and a location of the interfered peak on the detector of the optical spectrometer;
fitting a plurality of curves to the interfered peak, each curve corresponding to one of the plurality of spectral emissions of different wavelengths forming the interfered peak, wherein each curve is fitted using the interfered curve parameters provided by the model of expected curve parameters; and
outputting the plurality of curves for further analysis.

14. The optical spectrometry system of claim 13, wherein
the optical spectrometer comprises a plasma source configured to generate a plasma using the sample.

15. The optical spectrometry system of claim 13, wherein
the interfered curve parameters comprise first and second asymmetric interfered curve parameters in order to fit a plurality of asymmetric curves to the interfered peak.

16. The optical spectrometry system of claim 15, wherein
the interfered curve parameters are first and second bi-Gaussian curve parameters.

17. The optical spectrometry system of claim 13, wherein
the model of expected curve parameters for the optical spectrometer defines a relationship between a central wavelength of the interfered peak and the interfered curve parameters.

18. The optical spectrometry system of claim 13, wherein
the model of expected curve parameters is generated based at least in part on peak shapes and associated detector locations of a plurality of spectral peaks of a calibration spectrum generated from a calibration sample using the optical spectrometer.

19. The optical spectrometry system of claim 13, wherein
the sample spectrum is generated by the optical spectrometer using an echelle grating to diffract sample light onto a two-dimensional detector.

20. The optical spectrometry system of claim 13, wherein
fitting each of the plurality of curves to the interfered peak comprises selecting a peak wavelength and a peak intensity for each of the curves to be fitted to the interfered peak.

* * * * *